Sept. 17, 1929.  H. S. PETCH  1,728,835
PHASE INDICATOR
Filed May 1, 1928

Inventor:
Herbert S. Petch,
by Charles V. Tullar
His Attorney.

Patented Sept. 17, 1929

1,728,835

UNITED STATES PATENT OFFICE

HERBERT STANLEY PETCH, OF LONDON, ENGLAND, ASSIGNOR TO GENERAL ELECTRIC COMPANY, A CORPORATION OF NEW YORK

PHASE INDICATOR

Application filed May 1, 1928, Serial No. 274,327, and in Great Britain June 9, 1927.

This invention relates to a method of and apparatus for indicating the phase difference between two electric quantities and especially to a method for indicating power-factor.

I have found that space discharge devices such, for example, as are now most commonly used in radio communication apparatus may conveniently be used to measure the phase difference between two electric quantities as for example the voltage and current in an electric circuit. It is the principal object of this invention to provide a method for measuring phase difference by employing space discharge devices together with comparatively simple and inexpensive apparatus.

Figure 1:
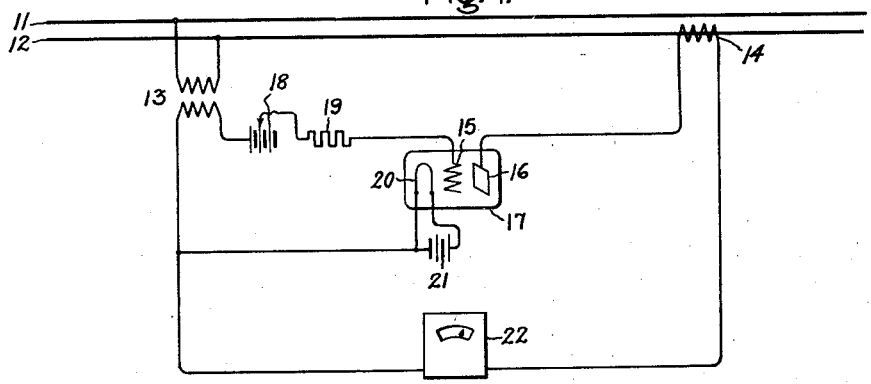
Figure 2:
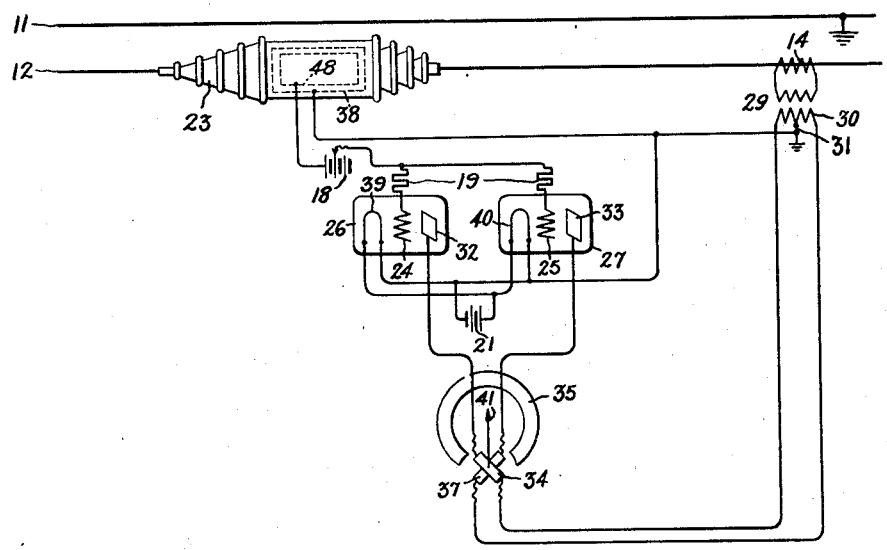
Figure 3:
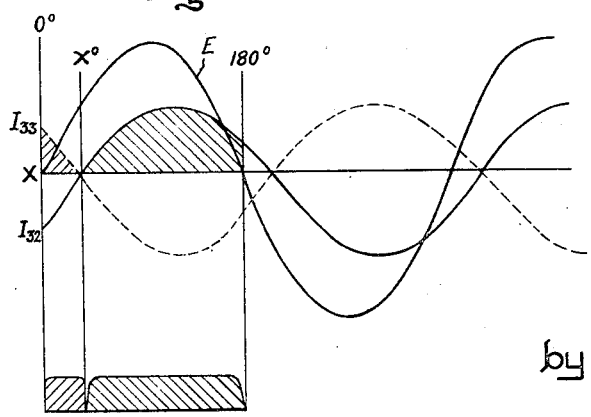

The features which I consider novel and characteristic of my invention are pointed out in the appended claims. My invention itself, however, will best be understood by reference to the following specification when considered in connection with the accompanying drawing in which Fig. 1 illustrates a power-factor measuring system employing a discharge device having anode, cathode and control electrodes. The anode of the device is excited through a current transformer and the control electrode is excited through a voltage transformer. The cathode is heated by a battery or other source and an ammeter in the anode circuit is calibrated to indicate power factor. Fig. 2 is another arrangement for measuring power factor employing two space discharge devices, a condenser instead of the voltage transformer and a differential ammeter calibrated to indicate power factor. Fig. 3 is a graph indicating a possible relation of values of voltage, current and space-current, flowing in the line and instrument respectively, in the arrangement of Fig. 2.

Referring to the drawings in detail, I have indicated conductors 11 and 12 as part of an electric circuit whose power factor is to be measured. Voltage transformer 13 and current transformer 14 impress potentials upon the grid or control electrode 15 and the plate or anode 16, respectively, of a space discharge device 17. These potentials are proportional and substantially in phase with the voltage and current, respectively, of the circuit represented by lines 11 and 12. Grid 15 is connected to one end of the secondary winding of transformer 13, in series with a bias battery 18 and a current limiting resistance 19. The other end of this secondary winding is connected to the cathode 20, of the device 17, which is heated from any convenient source 21. The plate 16 is connected to one end of the secondary of the current transformer 14. The other end of this secondary is connected to the filament 20 through a milli-ammeter 22.

In operation, an alternating potential proportional and in phase with the line current is impressed upon the anode and an alternating voltage proportional to and in phase with the line potential, is impressed upon the control electrode. It is, of course, possible to reverse this order but it is convenient to use capacity transformers in impressing the voltage upon an electrode of the discharge device from high potential circuits and it is therefore, desirable to impress this potential on the control electrode circuit in which substantially no current is permitted to flow. When the line current and line voltage are in phase the potentials upon the anode and control electrodes will be in phase. A space current will flow in the anode circuit including anode 16, transformer 14, instrument 22, cathode 20, and device 17 when both the anode and control electrode potentials are positive. No current will flow in the anode circuit when either the anode or control electrode potentials, or both are negative. It is, therefore, evident that when the potentials are in phase, the greatest possible space current will flow and that any variation from this condition will correspondingly reduce this space current. The instrument 22 can, therefore, be calibrated to read per cent power factor directly.

Precautions must be taken to avoid change of space current due to changes in plate potential caused by variations in current in the line 12. If the ordinary high vacuum discharge device is used, a saturated core current transformer, or operation of the device at anode potentials high enough to make the space current independent of variations in this potential, will substantially eliminate this variable. It is also possible to use grid controlled arc-discharge devices such, for example as described in U. S. Letters Patent 1,654,949, in which the space current is directly dependent upon the phase relation between the anode and grid, or control electrode, potentials.

In Fig. 2, I have illustrated the preferred form of my invention in which two discharge devices instead of one are used. Numerals 11 and 12 again represent sections of conductors of a circuit whose power-factor is to be measured. Space discharge devices 26 and 27 include control electrodes 24 and 25, cathodes 39 and 40 and anodes 32 and 33 respectively. A capacity transformer 23 which may be of the construction described in U. S. Letters Patent 1,657,249, to Eby impresses a potential proportional to the voltage between conductor 12 and ground. The inner electrode 48 of the condenser 23 is connected to the two control electrodes 24 and 25 through a bias battery 18, and a resistance 19 in series with each control electrode. A current transformer 14 feeds the primary of an auxiliary transformer 29. The secondary 30 of the transformer 29 is tapped at its midpoint 31. One end of the secondary 30 is connected to anode 32 through one coil 34 of a differential instrument 35. The other end of the secondary 30 is connected to anode 33 through coil 37 of the instrument 35. The midpoint 31 is grounded and is connected to the cathodes 39 and 40 as well as the outer electrode 38 of condenser 23. The condenser 23 is used in this figure to illustrate its application on high tension circuits. In such cases a saving over the cost of a potential transformer is made by its use. The current flowing in this condenser circuit is reduced to a minimum by resistances 19. Therefore, the phase difference between the line voltage and the potential upon the grids is so small that it may be disregarded. The phase difference between the potential impressed upon the anodes and the current in the line is also very small, and can be disregarded, or in an extreme case, be compensated for in calibration of the instrument.

In operation, the grids 24 and 25 become negative and positive simultaneously and the anodes 32 and 33 become positive and negative alternately. As stated in connection with the previous figure current will flow in the anode circuit only when both the anode and control electrodes are at a positive potential. Assuming then, a substantial in-phase relation, a positive potential on the control electrodes and a positive potential on anode 32, space current will flow from anode 32 through coil 34, winding 30, cathode 39 back to anode 32. Since this is the in-phase condition the maximum plate current will flow and pointer 41 will have its greatest deflection. During the same half cycle plate 33 is sufficiently negative so that no plate current will flow in coil 37. The control electrode 25 will be positive but any tendency for current flowing in this circuit is minimized by resistance 19. During the following half cycle control electrodes 24 and 25 are negative, anode 32 is negative and anode 33 is positive. No current flows, therefore, in coil 34 and since grid 25 is negative practically no current will flow in coil 37 although anode 33 is positive.

In Fig. 3, I have illustrated graphically the relation of voltage, current and space current in the arrangement of Fig. 2, when the line current and line voltage are out of phase. Curve E in this graph represents the potential on the control electrodes 24 and 25, line $I_{32}$ illustrates the potential on anode 32 and $I_{33}$ represents the potential on anode 33, the shaded portion between the horizontal axis X and the portion of curves $I_{32}$ and $I_{33}$ above the axis, represents the time during which space current flows. The line, or curve E starts at the vertical line 0° and remains above the axis X until the line 180° is reached. It may be considered as having a plus value between 0° and 180° after which it is negative for another 180°. The curve $I_{32}$ is shown as lagging behind the curve E, and cuts the axis X at $x°$. After the $x°$ line $I_{32}$ is above the axis X and may be considered positive. Between 0° and $x°$ the line $I_{33}$ is above the axis X and is, therefore, positive. From the foregoing explanation it is now apparent that space current will flow in coil 37 during the time the curves are between 0° and $x°$ and that space current will flow in coil 34 during the time the curves are between $x°$ and 180°. For convenience sake the areas have been projected below the axis X and clearly illustrate their comparative values. The pointer 41, therefore, deflects proportionately less as the space current in coil 37 increases.

In accordance with the provisions of the patent statutes, I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:—

1. A method for measuring power factor which consists of producing simultaneously two potentials proportional to and in fixed phase relation with the voltage of a circuit, producing alternately two potentials proportional to and in fixed phase relation with the current in said circuit, controlling thereby two space discharge paths and measuring differentially the discharge currents in said paths.

2. In combination two space discharge devices each including a cathode, anode and control electrode, a transformer for simultaneously impressing a potential upon said control electrodes which is proportional to and in predetermined phase relation with an electrical quantity of a circuit, a transformer for alternately impressing upon said anodes a potential proportional to and in predetermined phase relation with another electrical quantity of said circuit and a differential instrument having one coil in circuit with one anode, another coil in series with the other anode, adapted to measure the phase difference between said quantities.

3. A power factor indicator including two space discharge devices each having a cathode, control electrode and anode, a condenser adapted to impress a potential proportional to the voltage of a conductor upon the said control electrodes simultaneously, a transformer adapted to impress a potential proportional to the current in said conductor upon said anodes alternately, and a differential ammeter one coil of which is connected in series with one of said anodes and the second coil in series with the other of said anodes.

4. A power factor indicator including a space discharge device having a cathode, anode and control electrode, means, including a transformer, for impressing a potential proportional to and in predetermined phase relation with the voltage of a circuit upon said control electrode, means, including a current transformer, for impressing upon said anode a potential proportional to and in predetermined phase relation with the current in said circuit, and means responsive to variations in anode current for indicating the phase relation between said potentials.

In witness whereof, I have hereunto set my hand this 13th day of April, 1928.

HERBERT STANLEY PETCH.